United States Patent [19]

Smith

[11] Patent Number: 5,523,133
[45] Date of Patent: Jun. 4, 1996

[54] HIGH TEMPERATURE CERAMIC COMPOSITE

[75] Inventor: Robert G. Smith, St. Paul, Minn.

[73] Assignee: Minnesota Mining and Manufacturing Company, St. Paul, Minn.

[21] Appl. No.: 276,260

[22] Filed: Jul. 18, 1994

Related U.S. Application Data

[63] Continuation of Ser. No. 747,647, Aug. 20, 1991, abandoned.

[51] Int. Cl.$^6$ .................................................... B32B 18/00
[52] U.S. Cl. ................. 428/34.4; 428/34.5; 428/34.6; 428/36.1; 428/36.3; 428/283; 428/288; 428/323; 428/408; 428/688; 428/698; 428/704; 428/90; 501/95; 501/96; 501/99
[58] Field of Search ......................... 501/95, 96, 99; 428/902, 283, 288, 289, 688, 668, 704, 34.4, 34.5, 34.6, 36.1, 36.3, 408, 323, 698

[56] References Cited

U.S. PATENT DOCUMENTS

| | | | |
|---|---|---|---|
| 3,565,683 | 2/1971 | Morelock | 117/215 |
| 3,672,936 | 6/1972 | Ehrenreich | 117/46 |
| 4,605,588 | 8/1986 | Simpson et al. | 428/288 |
| 4,642,271 | 2/1987 | Rice | 428/698 |
| 4,650,775 | 3/1987 | Hill | 501/95 |
| 4,735,850 | 4/1988 | Eitman | 428/283 |
| 4,751,205 | 6/1988 | Hill et al. | 501/95 |
| 4,752,503 | 6/1988 | Thebault | 427/248.1 |
| 4,766,013 | 8/1988 | Warren | 427/228 |
| 4,894,286 | 1/1990 | Gray | 428/446 |
| 4,961,990 | 10/1990 | Yamada et al. | 428/240 |
| 4,970,095 | 11/1990 | Bolt et al | 427/226 |
| 4,981,822 | 1/1991 | Singh et al. | 501/95 |
| 5,017,522 | 5/1991 | Hegedus | 501/95 |
| 5,071,600 | 12/1991 | Deleeuw | 501/95 |

FOREIGN PATENT DOCUMENTS 0495570  7/1992  European Pat. Off. ........ C04B 35/80

OTHER PUBLICATIONS

"Metal Oxide Fibers Create Forms for Silicon Carbide Deposition," *Design News*, Sep. 7, 1987, by Cahners Publishing Company.

"Siconex™ Fiber–Reinforced Ceramic" Data Sheet, New Products Department, 3M Industrial and Consumer Sector, 3M, Aug. 1, 1991.

*Primary Examiner*—Ellis P. Robinson
*Assistant Examiner*—Timothy M. Speer
*Attorney, Agent, or Firm*—Gary L. Griswold; Walter N. Kirn; Gregory D. Allen

[57] ABSTRACT

This invention provides a shaped ceramic composite article comprising ceramic oxide fiber(s), a first coating comprising a carbonaceous matrix which includes boron nitride particles in contact therewith, and a second coating comprising silicon carbide. The inventive composite article is useful in applications requiring good heat resistance and mechanical properties, such as gas fired radiant burner tubes, gas burner nozzle liners, heat exchangers, thermowells, core busters or flame dispersers, and other gas fired furnace components.

12 Claims, 1 Drawing Sheet

HIGH TEMPERATURE CERAMIC COMPOSITE

This is a continuation of application Ser. No. 07/747,647, filed Aug. 20, 1991, now abandoned.

BACKGROUND OF THE INVENTION

1. Field of the Invention

This invention relates to a shaped ceramic composite article comprising ceramic oxide fiber(s), a first coating comprising a carbonaceous matrix which includes boron nitride particles in contact therewith, and a second coating comprising silicon carbide. In another aspect, the present invention provides a method of making the same.

2. Description of the Related Art

Radiant burner tubes are used in high temperature, corrosive environments such as that found in industrial heat treating furnaces and aluminum melting furnaces. The three most common types of commercially available radiant burner tubes are metal alloy (e.g., nickel-based superalloy) tubes, ceramic (e.g., silicon carbide) monolith tubes, and ceramic composite (e.g., ceramic fibers and ceramic cloth in a ceramic matrix) tubes. The upper use temperature of such tubes is typically in the range from about 900° (1650° F.) to about 1260° C. (2300° F.).

Although monolithic silicon carbide radiant burner tubes with an upper use temperature up to about 1260° C. are available, such tubes are typically very brittle and prone to fail, a common problem of conventional, shaped ceramic monoliths.

While it is possible to select a ceramic composite from which to prepare a radiant burner tube which meets most, but not necessarily all, of the requirements for use in high temperature, chemically corrosive environments, it is only possible by taking great care in the selection and by making some compromises in properties.

A commercially available ceramic composite radiant burner tube is marketed, for example, under the trade designation "SICONEX" by the Minnesota Mining and Manufacturing Company (3M) of St. Paul, Minn. "SICONEX" radiant burner tubes are a ceramic-ceramic composite comprised of aluminoborosilicate ceramic fibers, a carbonaceous layer, and a silicon carbide layer. "SICONEX" radiant burner tubes are prepared by braiding, weaving, or filament winding aluminoborosilicate ceramic fibers in the shape of a tube, or alternatively, fashioning aluminoborosilicate ceramic cloth into a tube shape. The ceramic fiber tube shape is treated with a phenolic resin which is cured, producing a rigidified article. The rigidified article is heated in an evacuated chamber such that the cured phenolic resin is carbonized. The article is then coated with silicon carbide via chemical vapor deposition at temperatures ranging from about 900° to about 1200° C. to provide a semi-permeable, chemically resistant coating of silicon carbide. The resultant rigid ceramic composite tube is useful at high temperatures in corrosive environments.

The upper use temperature of "SICONEX" radiant burner tubes under typical operating conditions is about 1260° C. Above about 1260° C. such tubes typically exhibit properties characteristic of ceramic monoliths (i.e., brittleness). There is a long-standing need to improve the upper temperature limit and the mechanical characteristics of such a composite.

While there have been many approaches to improving mechanical characteristics of ceramic composites, such efforts have rarely been coupled with a significant improvement in the high temperature performance of the composite.

For example, U.S. Pat. No. 3,672,936 (Ehrenreich) discloses a reinforced carbon article which comprises a carbon fiber shape bonded by a carbon binder and having incorporated within the article the in situ reaction product of carbon and a boron-containing additive which comprises a material selected from the group consisting of boron, boron nitride, boron silicide, and refractory metal borides. The reinforced carbon article is made by forming a carbon fiber shape, dispersing the boron-containing additive within at least a portion of the carbon fiber shape, impregnating the carbon fiber shape with a carbonizable binder, and heating the shaped article to carbonize the binder and to form in situ the reaction product of carbon and the boron-containing additive.

U.S. Pat. No. 3,565,683 (Morelock) teaches a method of depositing a boro-carbon coating onto filaments, wherein an electrically heated surface of a pyrolytic carbon coated fused silica or quartz filament is passed through a liquid, thermally decomposable boron compound such as boron trichloride dissolved in a non-polar organic solvent such as benzene. The heated portion of the filament produces an envelope of solvent vapor and boron trichloride gas which are pyrolytically decomposed and carbon and boron are simultaneously deposited on the fiber.

U.S. Pat. No. 4,605,588 (Simpson et al.) discloses a process for creating a substantially uniform boron nitride barrier coating on the surface of oxide-based ceramic fibers, wherein an oxide-based ceramic fiber containing boron is heated for about 5–90 minutes in a nitriding atmosphere of ammonia, hydrogen and nitrogen at a temperature of between about 2200°–2600° F. to diffuse boron from the fiber to the surface or slightly within the fiber where it reacts to form the boron nitride coating.

U.S. Pat. No. 4,642,271 (Rice) discloses a ceramic fiber composite material comprised of boron nitride coated ceramic fibers (e.g., SiC fibers, $Al_2O_3$ fibers, and graphite fibers) embedded in a ceramic matrix (e.g., SiC, $ZrO_2$, 96% $SiO_2$ with 4% $B_2O_3$, mullite, cordierite, and carbon).

U.S. Pat. No. 4,650,775 (Hill) describes a thermally-bonded fibrous product composed of a sintered blend of aluminosilicate fibers, silica powder, and boron nitride powder.

U.S. Pat. No. 4,751,205 (Hill et al.) teaches a thermally-bonded fibrous product composed of a sintered blend of ceramic fibers, low-grade silica material, and boron nitride.

U.S. Pat. No. 4,752,503 (Thebault) discloses a thin, refractory, intermediate adhesive layer of laminar structure (e.g., pyrocarbon or boron nitride) deposited in an oriented fashion by chemical vapor deposition onto reinforcing fibers, wherein the intermediate layer has a greater elongation at break than the matrix and has a thickness of between 0.2 and 3 micrometers.

U.S. Pat. No. 4,766,013 (Warren) describes a fibrous ceramic matrix composite article said to be useful in corrosive environments. The composite article comprises a porous carbon fibrous substrate or other suitable high temperature fibrous substrate which may include a pyrolytic carbon or appropriate chemical vapor deposited sheath formed about each fiber of the substrate; a chemically vapor deposited metallic carbide, oxide, boride or nitride coating over the coated fibers of the substrate; and an impermeable metallic carbide, oxide, boride, or nitride outer protective layer formed about the entire periphery of the coated substrate.

U.S. Pat. No. 4,970,095 (Bolt et al.) teaches an improved method for depositing boron nitride coatings on ceramic fibers.

U.S. Pat. No. 4,981,822 (Singh et al.) discloses a composite article produced by depositing a slurry of infiltration-promoting material and organic binding material on a layer of boron nitride-coated fibrous material forming a tape therewith on drying, firing the tape to burn out organic binding material, and infiltrating the resulting porous body with a molten solution of boron and silicon. Patentees state that in carrying out the inventive process, the boron nitride is to be coated on the fibrous material to produce a coating thereon which leaves no significant portion, and preferably none, of the fibrous material exposed.

SUMMARY OF THE INVENTION

The present invention provides a shaped composite article comprising ceramic oxide fiber(s), the ceramic oxide fiber(s) having in the composite a surface which is available for coating, a first coating at least partially covering the available surface of the ceramic oxide fiber(s) to provide a surface which is available for overcoating, and a second coating at least partially covering that portion of the surface which is available for overcoating, wherein the first coating comprises a carbonaceous matrix which includes boron nitride particles (i.e., boron nitride regions or islands) in contact therewith (preferably at least partially embedded therein), and the second coating comprises silicon carbide, with the proviso that the second coating covers at least a portion of the first coating. The boron nitride particles are preferably encapsulated by the carbonaceous matrix or by the carbonaceous matrix and silicon carbide.

The term "carbonaceous" as used herein means a carbon matrix or coating wherein substantially all of the carbon is amorphous. The carbonaceous matrix in regard to an individual fiber typically has a thickness in the range from greater than zero to about 1 micrometer. Preferably, the carbonaceous matrix has a thickness in the range from greater than zero to about 50 nanometers. The minimum thickness of the carbonaceous matrix is that which is needed to provide a rigidified article suitable from the process described herein to make a composite article of the present invention. While matrix thicknesses greater than about 1 micrometer are useful, there is no significant improvement when the thickness exceeds about 1 micrometer, thus, such alternatives are not economical.

The term "carbonaceous matrix which includes boron nitride particles in contact therewith" as used herein refers to a carbonaceous matrix having boron nitride particles dispersed with the carbonaceous matrix, boron nitride particles at least partially embedded in the carbonaceous matrix, or boron nitride particles otherwise attached or adhered to a surface of the carbonaceous matrix.

A certain portion of the exposed surface area of the ceramic fiber(s) within the shaped composite article is available for coating. The term "available surface for coating" refers to that portion of the exposed surface area of the ceramic fiber(s) available for coating. For example, the surface area of a fiber(s) which would be unavailable for coating includes that which, due to braiding, weaving, knitting, or winding of the fiber(s), is in contact with itself or with another fiber(s).

A certain portion of the exposed surface area of the ceramic oxide fiber(s) having the first coating thereon within the shaped composite article is available for overcoating. The term "available surface for overcoating" refers to that portion of the exposed surface of the ceramic oxide fiber(s) having the first coating thereon available for overcoating (i.e., the sum of the exposed surface area of the first coating available for overcoating and the remaining exposed surface area of the ceramic oxide fiber(s) which was available for coating, but was not covered by the first coating).

Generally, the first coating covers at least about 1 percent of the surface available for coating and the second coating covers at least about 50 percent of the surface available for overcoating.

Preferably, the first coating covers at least 90 percent of the surface available for coating and the second coating covers at least about 90 percent of the surface available for overcoating. Most preferably, the first coating covers about 100 percent of the surface available for coating and the second coating covers about 100 percent of the surface available for overcoating.

Preferably, the ceramic oxide fiber(s) are present in the range from about 20 to about 50 percent by weight, the carbonaceous matrix is present in the range from about 0.2 to about 20 percent by weight, the boron nitride is present in the range from about 0.2 to about 15 percent by weight, and the silicon carbide is present in the range from about 50 to about 75 percent by weight, based on the total weight of the composite article.

More preferably, the ceramic oxide fiber(s) are present in the range from about 25 to about 35 percent by weight, the carbonaceous matrix is present in the range from about 0.5 to about 6 percent by weight, the boron nitride is present in the range from about 0.75 to about 6 percent by weight, and the silicon carbide is present in the range from about 60 to about 75 percent by weight, based on the total weight of the composite article.

The composite article of the invention preferably comprises a plurality of ceramic oxide fiber(s) such as, for example, a yarn comprising a plurality of individual ceramic oxide fibers.

Preferably, the ceramic oxide fibers are selected from the group consisting of alumina fibers, aluminosilicate fibers, and aluminoborosilicate fibers. The most preferred fibers are aluminoborosilicate fibers.

A preferred method of making a composite article according to the present invention comprises the steps of:

(a) providing a shaped, rigidified article comprising ceramic oxide fiber(s), the ceramic oxide fiber(s) having in the shaped, rigidified article a surface which is available for coating, a coating of cured organic resin which includes boron nitride particles in contact therewith, wherein the coating covers at least a portion of the surface of the ceramic fiber(s) available for coating, and wherein the organic resin is capable of being carbonized;

(b) carbonizing the cured organic resin to provide a first coating at least partially covering the surface of the ceramic oxide fiber(s) available for coating to provide a surface which is available for overcoating, the first coating comprising a carbonaceous matrix which includes boron nitride particles in contact therewith; and (c) depositing a second coating comprising silicon carbide onto at least a portion of the surface available for overcoating, with the proviso that the second coating covers at least a portion of the first coating, to provide the composite article of the invention.

The composite article of the invention can be any of a variety of shapes including, for example, a hollow tube, sheets, cones, and complex shapes. The term "complex shape" as used herein refers to a variety of shapes in which the ceramic oxide fiber can be formed, and processed according to the method described herein to make the composite article of the invention.

Particularly useful embodiments of the present invention include gas-fired radiant heat burner tubes, gas burner nozzle liners, heat exchangers, thermowells, core busters or flame dispersers, and other furnace elements (including other gas fired furnace components or elements).

DETAILED DESCRIPTION OF PREFERRED EMBODIMENTS

Figure 1:
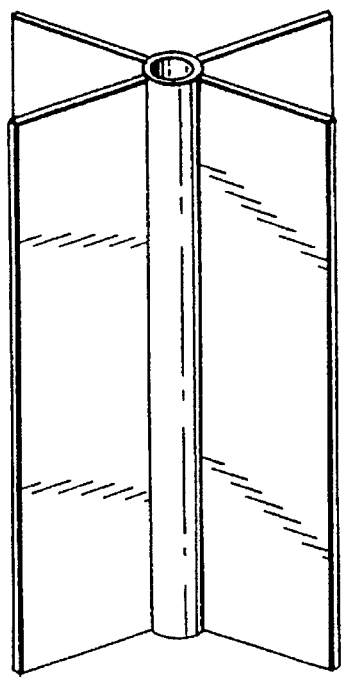
FIG. 1 is a perspective of a core buster or flame disperser in accordance with the present invention.

The invention provides a shaped, rigid, ceramic article which exhibits good toughness and high temperature resistance, wherein high temperature resistance means minimal degradation of the mechanical properties at a temperature of about 1000° C. Typically, a preferred composite article according to the present invention is capable of use up to a temperature of about 1500° C., and is generally semipermeable to gas (e.g., air). Preferably, the inventive composite article exhibits good composite properties.

Preferably, the ceramic oxide fiber(s) comprising the inventive composite article include at least one of alumina fiber(s), aluminosilicate fiber(s), and aluminoborosilicate fiber(s).

Methods for making alumina fibers are known in the art and include, for example, the method disclosed in U.S. Pat. No. 4,954,462 (Wood et al.), the disclosure of which is incorporated herein by reference.

Suitable aluminosilicate fibers are described in U.S. Pat. No. 4,047,965 (Karst et al.), the disclosure of which is incorporated herein by reference. Preferably, the aluminosilicate fibers have an alumina content in the range from about 67 to 77 percent by weight and a silica content in the range from about 33 to about 23 percent by weight, based on the total oxide content of the fiber.

U.S. Pat. No. 3,795,524 (Sowman), the disclosure of which is incorporated herein by reference, teaches a method for making aluminoborosilicate fibers. Suitable aluminoborosilicate fibers preferably have an alumina to boria mole ratio in the range from about 9:2 to about 3:1.5, and a silica content in the range from greater than zero to about 65 percent by weight, based on the total oxide content of the fiber.

Preferably, the ceramic oxide fibers are polycrystalline or amorphous and polycrystalline.

The ceramic oxide fibers preferably have a diameter in the range from about 1 to about 50 micrometers. More preferably, the diameter of the fibers is in the range from about 10 to about 25 micrometers. The cross-section of the fibers may be circular or elliptical.

Typically, individual ceramic oxide fibers are grouped together to form a yarn. Generally, the ceramic oxide yarn has a diameter in the range from about 0.2 mm to about 1.5 mm. Yarn diameters in the specified ranges typically have superior textile qualities as compared to yarns with diameters outside these ranges. Such yarns typically comprise in the range from about 780 to about 7800 individual ceramic oxide fibers. Preferably, the yarn comprises in the range from about 1560 to about 4680 individual fibers.

Preferably, the ceramic oxide yarn is ply-twisted because such a construction has better strength than a yarn which is not ply-twisted.

Suitable alumina yarns are commercially available and include those marketed by the Minnesota Mining and Manufacturing Company (3M) of St. Paul, Minn., under the trade designation "NEXTEL 610 CERAMIC FIBER." Commercially available aluminoborosilicate yarns include those marketed under the trade designations "NEXTEL 312 CERAMIC FIBER" and "NEXTEL 440 CERAMIC FIBER" from 3M.

The ceramic oxide yarn can be formed into a desired shape using conventional techniques known in the art including, for example, braiding, knitting, or weaving the yarn into the desired shape (e.g., a hollow tube); braiding or weaving the yarn into a cloth or fabric and forming the cloth into a desired shape (e.g., a hollow tube or a flat sheet); or winding the yarn around a mandrel (e.g., helically winding or cross-winding the yarn around a mandrel).

Figure 2:
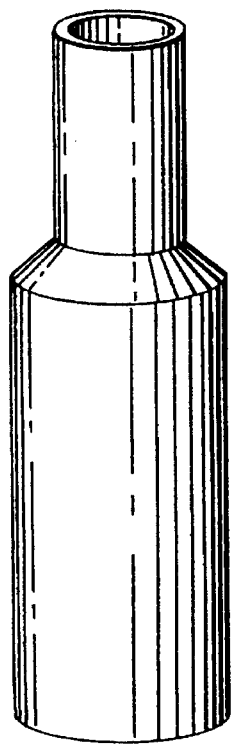
FIG. 2 is a perspective of a stepped burner liner in accordance with the present invention.
Figure 3:
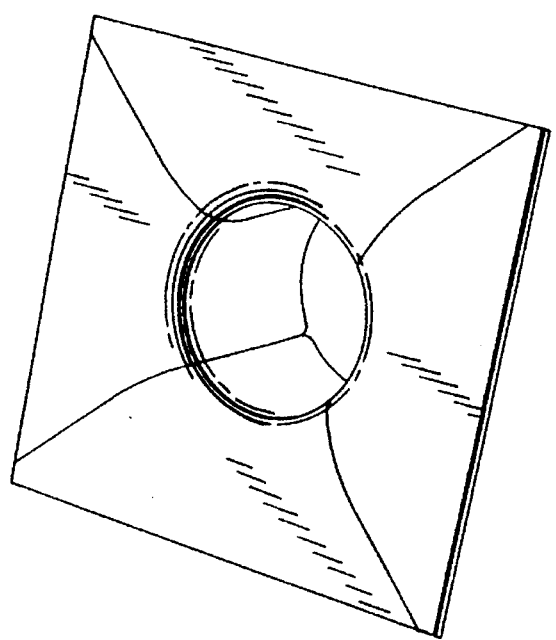
FIG. 3 is a perspective of a type of burner liner in accordance with the present invention.

More complex shapes can be made by forming the fiber(s) into the desired shape using conventional shaping techniques. Complex shapes can be formed, for example, by stitching ceramic oxide cloth together with ceramic oxide fiber or yarn. Although the ceramic oxide cloth may be stitched together before or after the (cured or uncured) organic resin is applied to the ceramic oxide cloth, it is preferable to stitch the cloth together before the organic resin is applied. Examples of complex shaped articles in accordance with the present invention are illustrated in FIGS. 1–3.

The organic resin can be any suitable organic-based resin which is compatible with the method described herein for making the article of the invention and which is capable of being carbonized. Preferably, the organic resin which is coated onto the ceramic oxide fiber(s) is a phenolic resin, wherein "phenolic resin" is a term that describes a wide variety of resin products which result from the reaction product of phenols with aldehydes. Phenolic resins include, for example, acid catalyzed phenolic resins and base catalyzed phenolic resins. Phenolic resins are commercially available, for example, under the trade designations "DURITE-SC-1008" from Borden Chemical of Columbus, Ohio, and "BKUA-2370-UCAR" (a water-based phenolic resin solution) from Union Carbide of Danbury, Conn.

The organic resin can be coated onto the fibers using conventional coating techniques including brush coating, pour coating (i.e., pour the resin onto the fibers and allow the excess resin to drain off), dip coating, roll coating, spray coating, etc.

In order to more easily coat the fibers with the organic resin, the viscosity of the resin is usually lowered by adding a compatible organic solvent such as acetone or methanol to the resin, or by adding water to a water-based phenolic resin solution.

Boron nitride particles can be incorporated into the inventive composite article during one or more steps in the process, for example, (1) boron nitride particles can be dispersed in the organic resin before the resin is coated onto the ceramic oxide fiber(s); (2) boron nitride particles can be applied to the organic resin prior to curing (e.g., boron nitride particles can be applied to coated organic resin before the organic resin has dried); (3) a dispersion of boron nitride particles can be coated onto the dried resin; (4) a dispersion of boron nitride particles can be applied to the cured resin; (5) a dispersion of boron nitride particles can be applied to a ceramic oxide fiber, yarn, or cloth before the organic resin is applied; or (6) boron nitride particles can be incorporated into ceramic oxide fabric, for example, by applying dry boron nitride particles to the ceramic oxide fabric or by rubbing boron nitride particles into the ceramic oxide fabric, before the organic resin is applied.

It is also within the scope of the present invention to apply organic resin or organic resin having boron nitride particles dispersed therein to a ceramic oxide fiber or yarn before the fiber or yarn is braided, knitted, woven, or wound.

The boron nitride particles typically have a particle size in the range from about 0.5 to about 30 micrometers. Preferably, the boron nitride particles have an average particle size of less than about 1 micrometer. Boron nitride particles are commercially available, for example, under the trade designation "CERAC B-1084, BORON NITRIDE POWDER" from Cerac of Milwaukee, Wis.

For a phenolic resin or phenolic resin/organic solvent blend having boron nitride particles dispersed therein, the preferred amount of boron nitride is in the range from greater than zero to about 20 percent by weight, based on weight of the phenolic resin or phenolic resin/organic solvent blend. More preferably, the boron nitride content of a phenolic resin or organic resin/organic solvent having boron nitride particles dispersed therein is in the range from about 4 to about 16 percent by weight, based on the weight of the phenolic resin or phenolic resin/organic solvent blend, and, most preferably, it is in the range from about 4 to 12 percent by weight.

The organic resin is preferably dried (i.e., solvents, liquid vehicles, and other volatile constituents are removed) prior to curing. The organic resin can be dried using drying techniques known in the art including air drying, heating, etc.

The organic resin can be cured using conventional curing techniques including heating.

Boron nitride particles can be added to the dry or cured organic resin by providing boron nitride particles and a means for attaching the particles to the dried or cured organic resin. A preferred method of adding boron nitride particles to the dried or cured organic resins is to disperse the boron nitride particles in a liquid vehicle (e.g., acetone or petroleum naphtha, also known as "odorless mineral spirits," commercially available from Union Chemical/Division of Union Oil Co. of California, Rolling Meadows, Ill.; or from Phillips Petroleum Company of Borger, Tex., under the trade designation "SOLTROL 130"), and then coat (e.g., dip coating, brush coating, spray coating, etc.) the dried or cured resin coated article with the dispersion. Because the boron nitride particles have a tendency to settle, the dispersion is preferably continually agitated during coating. To further aid in dispersing the boron nitride in the liquid vehicle, conventional ultrasonic dispersion techniques can be used.

The cured organic resin is carbonized using conventional techniques including heating the rigidified article in a furnace chamber at a temperature, for a time, and in an atmosphere sufficient to carbonize the cured organic resin. Heating can be, for example, by resistive heating or induction heating. An appropriate carbonizing atmosphere is a non-oxidizing atmosphere. Such an atmosphere can be provided, for example, by evacuating the furnace chamber, by flowing a non-oxidizing gas (e.g., a reducing gas, such as $H_2$; a neutral gas, such as $N_2$; or a combination thereof) through a partially evacuated furnace chamber, or by blowing a non-oxidizing gas through an unevacuated (i.e., a furnace atmosphere at atmospheric pressure or at a pressure in excess of atmospheric pressure) furnace chamber.

Typically, the cured resin is carbonized by heating it under a pressure in the range from about 5 to about 200 torr (preferably, in the range from about 5 to about 100 torr) at a temperature in the range from about 200° to about 1000° C. (preferably, in the range from about 250° to 500° C.) for about 10 minutes to about 2 hours.

The preferred rate at which rigidified article is heated is that which minimizes the processing time yet allows reaction and removal of volatile constituents from the cured organic resin at a rate sufficient to minimize or to prevent spalling, cracking, etc., of the resulting carbonaceous matrix.

Preferably, the rigidified article is heated according to the following schedule:

room temperature to about 250° C. at about 5° to about 35° C./minute (more preferably at about 5° to about 15° C./minute);

250° to about 450° C. at about 5° to about 15° C./minute (more preferably at about 5° to about 10° C./minute); and 450° to about 1000° C. at about 5° to about 35° C./minute (more preferably at about 20° to about 35° C./minute).

The preferred gas flow rate of a non-oxidizing gas is dependent on the size of the furnace chamber. For example, the preferred gas flow rate for a 91.4 cm (3 feet) long, 7.6 cm (3 inch) diameter quartz tube is in the range from about 1.5 to about 10 liters per minute.

The carbonized resin comprising the boron nitride particles can be overcoated with silicon carbide, for example, by chemical vapor deposition. Such coating methods are known in the art and include, for example, the method disclosed in U.S. Pat. No. 4,980,202 (Brennen et al.), the disclosure of which is incorporated herein by reference.

Suitable commercially available silicon carbide precursors include, for example, dimethyldichlorosilane also known as "DDS," and methyltrichlorosilane also known as "MTS."

Typically, the rigidified, shaped article comprising ceramic oxide fiber(s), cured organic resin, and boron nitride particles is placed in a chemical vapor deposition chamber (e.g., a quartz chamber), which is then evacuated. While flowing a non-oxiding gas through the evacuated chamber, the furnace is heated (e.g., resistively or inductively) to the desired carbonization temperature. Silicon carbide is then coated over the at least partially carbonized organic resin by introducing a silicon carbide precursor (e.g., DDS or MTS) into the chamber. Typically, the silicon carbide precursor is introduced in the chamber by bubbling a non-oxidizing gas through a suitable liquid silicon carbide precursor (such as DDS or MTS, which are highly volatile), or by independently introducing a gaseous silicon carbide precursor (such as DDS or MTS) into the chamber through a separate gas line. Typically, the chamber is evacuated to a pressure in the range from about 5 to about 50 torr. The preferred flow rates of the silicon carbide precursor and non-oxidizing gas are dependent on the size of the furnace chamber. For example, the preferred flow rates for a 91.4 cm (3 feet long), 7.6 cm (3 inch) diameter quartz tube are in the range from about 0.15 to about 20 liters per minute for the non-oxidizing gas and from about 0.15 to about 20 liters per minute for the silicon carbide precursor.

The time and temperature typically required to provide a composite article comprising in the range from about 50 to about 75 percent by weight silicon carbide is in the range from about 4 to about 30 hours, depending on the size of the article and from about 900° to about 1000° C., respectively. A composite article according to the present invention comprising about 50 percent by weight silicon carbide typically has better strength and toughness than does a composite article according to the present invention comprising less than about 50 percent by weight silicon carbide. Although the strength of the composite article according to the present invention improves with increasing amounts of silicon carbide, such increase in strength relative to the increased processing cost is generally not economically justified.

Typically, the composite article of the invention exhibits "composite" fracture properties rather than "monolithic" fracture properties. Ceramic composites comprising fibers generally have fibers sticking out from the fracture surface (i.e., exhibiting what is termed "fiber pullout"). The fracture surface of such a composite article having such fiber pullout is described as being "brushy." A brushy fracture surface is characteristic of a composite article having ceramic oxide fibers which have not fused together or fused to the matrix material. By contrast, a ceramic composite having fibers which fuse together or to the matrix is characteristic of a monolith. Fracture properties of a composite article having composite properties are characterized by producing on fracturing a fracture surface which is populated with the fracture ends of numerous ceramic fibers in a brush-like array. A monolith will, however, fracture catastrophically like a glass plate.

A preferred composite article according to the present invention typically has good composite properties and high temperature resistance which make them useful in high temperature applications (e.g., 1500° C.). Useful embodiments of the articles of the invention include radiant burner tubes and furnace elements, including gas fired radiant burner tubes, gas burner nozzle liners, heat exchangers, thermowells, core busters, or flame dispersers, and other furnace components or elements (e.g., other gas fired furnace components or elements).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

Example 1 illustrates the preparation of coupons (i.e., small sheets) of a composite article according to the present invention.

A woven ceramic cloth of aluminoborosilicate fibers having a boria content of about 2 percent (BF-22 weave; commercially available under the trade designation "NEXTEL 440 CERAMIC FIBER" from 3M) was heat-cleaned in a furnace at a temperature of about 550° C. for about 30 minutes in air. The furnace temperature was uniformly ramped from room temperature (i.e., about 21° C.) to about 550° C. over a period of about 1 hour. The heat-cleaned cloth was cut into 30.5 cm by 30.5 cm squares. Each cloth square to be coated with a carbonaceous precursor was laid onto a 1.6 mm (1/16 inch) thick aluminum sheet which had been covered with a smooth layer of aluminum foil.

A carbonaceous precursor was prepared by adding about 4 parts by volume of phenolic resin (percent solids of the phenolic resin was about 60 to 64 percent; density of the phenolic resin was about 1 g/cm$^3$; commercially available under the trade designation "DURITE SC-1008" from Borden Chemical of Columbus, Ohio) to about 95 parts by volume of reagent grade acetone (density of the acetone was about 0.8 g/cm$^3$) and stirring the resin/acetone for about 1 to 2 minutes. Several of the ceramic cloth squares were saturated with the carbonaceous precursor. The carbonaceous precursor was poured onto individual cloth squares in an amount sufficient to saturate the cloth. After the cloth was saturated with the carbonaceous precursor, any excess carbonaceous precursor was drained off by tilting the aluminum foil covered aluminum sheet on which the cloth was laid. About 190 grams of the carbonaceous precursor (i.e., phenolic resin/acetone) remained in a cloth after it was drained. Each aluminum foil covered aluminum sheet and cloth were placed in an exhaust hood to allow the solvent in the carbonaceous precursor to evaporate under ambient conditions. The saturated cloth was considered dry when the solvent odor was no longer observed (i.e., no longer sensed by smell). About 184 grams of solvent evaporated.

A second aluminum sheet with an aluminum foil covering was superimposed on the dried cloth with the edge of the aluminum sheet in alignment with the juxtaposed sheets clamped at several points around the edge. The carbonaceous precursor was cured by heating the sandwiched aluminum sheets, aluminum foil, and saturated cloth in a 200° C. preheated oven for about 20 minutes. After heating, the assembly was removed from the oven and allowed to cool to room temperature. The cloth was then removed from the sandwich assembly and the above-described coating process was repeated until the cured resin provided an add-on weight of about 4 weight percent of the cloth. A fresh sheet of aluminum foil was used for each coating process.

The cloth rigidified with 4 weight percent resin was cut into 7.6 cm×1.3 cm pieces or coupons.

About 5 grams of boron nitride powder (hexagonal crystal form) having an average particle size of less than about 1 micrometer (density of the boron nitride was about 2.25 g/cm$^3$; commercially available under the trade designation "CERAC B-1084" from Cerac of Milwaukee, Wis.) was dispersed in about 29 grams petroleum naphtha (commercially available from Union Chemical) division of Union Oil Co. of California, Rolling Meadows, Ill.) and about 29 grams of acetone. While stirring the boron nitride dispersion, each rigid, 7.6 cm by 1.3 cm coupon was dipped into the dispersion for several seconds. Each dip coated coupon was allowed to drain and then dry under ambient conditions. When dry, the boron nitride powder formed a thin whitish coating over the surface of each coupon.

Each dried coupon was mounted in a wire fixture and loaded into a conventional quartz chemical vapor deposition furnace tube. The 91.4 cm (3 foot) long quartz tube was about 7.6 cm (3 inches) in diameter. Hydrogen gas was passed through the quartz tube while the furnace was resistively heated to about 1000° C., during which time at least a portion of the cured resin carbonized. The heating schedule was as follows:

| room temperature (about 25° C.) | about 18 minutes |

| | | | to about 250° C. | |
|---|---|---|---|---|
| | | | 250° C. to 450° C. | about 20 minutes |
| | | | 450° C. to 1000° C. | about 45 minutes |

At about 1000° C. temperature, the flow of hydrogen gas was replaced with a flow of hydrogen gas which had been bubbled through dimethyldichlorosilane (i.e., a silicon carbide precursor). Byproducts and unreacted gases exited at the end of the tube opposite that into which the precursor was introduced. The exit gas flowed through the vacuum pumping system and then through a scrubbing system. The pressure within the quartz tube during the reaction of the silicon carbide precursor was in the range from about 2 to about 15 torr. The flow rate of the precursor gas provided about 0.15 liter per minute of dimethyldichlorosilane gas and about 1 liter per minute of hydrogen gas.

The phenolic resin having boron nitride powder dispersed therein was prepared as follows. About 4 ml of phenolic resin (DURITE SC-1008) was blended with about 95 ml of reagent grade acetone by stirring the ingredients for about 1 to 2 minutes. About 6 grams of boron nitride powder (CERAC B-1084) were added to the phenolic resin/acetone blend. The ingredients were stirred for about 2 minutes.

Fracture surfaces of the Example 2 samples tested revealed composite fracture properties characterized by a "brushy" fracture surface.

The results are provided in Table 1, below.

TABLE 1

| Example | Fiber substrate | Composite article contains boron nitride particles | SiC deposition time, hours | Weight % SiC of composite article | Flexure strength, MPa (psi) |
|---|---|---|---|---|---|
| 1 | "NEXTEL 440 CERAMIC FIBER" | Yes | 4 | 65.3 | 36.1 (5240) |
| 2 | "NEXTEL 440 CERAMIC FIBER" | Yes | 4 | 65.3 | 32.3 (4720) |
| Control A (3240)* | "NEXTEL 440 CERAMIC FIBER" | No | 4 | 57.3 | 22.3 18.6 (2700)* |
| Control B | "NEXTEL 312 CERAMIC FIBER" | No | 4 | 65.7 | 38.6 (5600) |

*Two "Control A" Examples were prepared

The reaction time was about 4 hours. The average silicon carbide content of the resulting composite articles was about 65.3 percent. The results are summarized in Table 1, below.

Control A was prepared as described above for Example 1 except boron nitride particles were not incorporated in the construction of the composite article (i.e., the dip coating step was skipped). Control B was prepared as just described for Control A except the woven ceramic cloth used was that marketed by 3M under the trade designation "NEXTEL 312 CERAMIC FIBER."

The mechanical strength of each sample, including Control A and B, was measured using a conventional 4-point mechanical flexure test. The specific test procedures used are described in ASTM D-790-86, which is a standard test method for flexure properties (of insulating materials). An average of 5 tests of each of Example 1, Control A, and Control B are given above in Table 1, below.

An examination of the fracture surfaces of samples tested using the 4-point mechanical flexure test using a conventional optical microscope at about 50× revealed that Example 1 and Control Example B had composite fracture properties characterized by a "brushy" fracture surface. In contrast, Control A did not exhibit a brushy fracture surface.

EXAMPLE 2

This example illustrates that boron nitride particles can be incorporated into the composite article by adding boron nitride powder to the organic resin before it is coated.

Example 2 was prepared and tested as described in Example 1, except the boron nitride particles were added to the phenolic resin before the resin was coated onto the ceramic cloth.

EXAMPLE 3

This example illustrates the burst strength of a composite tube according to the present invention.

A 7.6 meter (25 foot) roll of a 5.1 cm (2 inch) diameter braid sleeving (style AS-40) made of aluminoborosilicate fibers having a boria content of about 2 percent (commercially available under the trade designation "NEXTEL 440 CERAMIC FIBER" from 3M) was heat-cleaned by heating it in an air atmosphere furnace at a temperature of about 600° C. for about 4 hours (including ramping the temperature of the furnace from room temperature to about 600° C. at a rate of about 5° C. per minute).

Portions of the heat-cleaned sleeving were fitted onto 5.1 cm (2 inch) diameter mandrels. Each fitted sleeving portion was trimmed to about 25.4 cm (10 inches) in length. Each mandrel was supported over a catch tray in an exhaust hood such that it could be constantly and uniformly rotated about its long axis.

About 5 parts by volume of phenolic resin (DURITE SC-1008) was added to about 95 parts by volume of reagent grade acetone. The ingredients were stirred for about 2 minutes to provide a blend. About 6.8 parts by weight of boron nitride powder (CERAC B-1084) were added to the phenolic resin/acetone blend.

Each mounted sleeve was coated with the phenolic resin/ acetone/boron nitride dispersion while rotating the mandrel. The amount of dispersion coated was sufficient to completely cover the mounted sleeving. Because the boron nitride powder had a tendency to settle, the dispersion was continuously agitated while it was poured onto the mounted sleeving.

Each coated sleeving was rotated for about 40 minutes to allow the solvents present in the dispersion to evaporate, as well as to prevent the dispersion or components thereof from settling in one location.

The phenolic resin was cured by heating the mounted, coated sleeving for about 35 minutes in an air atmosphere oven preheated to about 210° C. After curing, the mounted, coated sleeving was removed from the oven and allowed to cool to room temperature.

The addition of the cured phenolic resin/acetone/boron nitride dispersion increased the weight of the sleeving about 13 to 14 percent.

The length of each cured sleeve was trimmed to about 20.3 (8 inches) and removed from the mandrel. Each cured sleeve was mounted in a conventional induction heated chemical vapor deposition furnace and processed as described in Example 1, except the quartz tube was about 61 cm (2 feet) in length with a diameter of about 20.3 cm (8 inches). The silicon carbide precursor was methyltrichlorosilane rather than dimethyldichlorosilane, the pressure within the furnace was about 60 torr, the reaction temperature was about 1000° C., the flow rate of the precursor provided about 1.5 liter per minute each of methyltrichlorosilane gas and hydrogen gas, and the silicon carbide deposition time was about 10 hours. The average silicon carbide content of the two sleeves prepared was about 64.3 percent.

Control C was prepared as described above for Example 3 except no boron nitride was added to the phenolic resin/acetone blend.

The burst strength of Example 3 and Control C were measured using an internal pressurization to failure test. Specifically, a bladder filled with hydraulic oil was fitted inside a 5.1 cm (2 inch) long section of the Example 3 tube. A pressure transducer was mounted such that it was capable of monitoring the internal pressure of the tubular shaped sample. The pressure of the hydraulic oil filled bladder was increased until the tubular sample burst. The pressure at which the sample burst is related to the burst strength of the sample by the following equation, $$\text{burst strength, } S_B = \frac{(P)(d)}{2t}$$

wherein P is the pressure at which the tube burst, d is the inner diameter of the tube, and t is the wall thickness of the tube. The average burst strength of ten 5.1 cm (2 inch) sections of Example 3 and ten 5.1 cm (2 inch) sections of Control C are given in Table 2, below.

TABLE 2

| Example | SiC deposition time, hours | Weight % SiC of composite article | Burst strength, MPa (psi) |
|---|---|---|---|
| 3 | 10 | 64.3 | 58.5 (8490) |
| Control C | 9 | 66.7 | 44.6 (6475) |

An examination of the fracture surfaces of the burst tubes revealed that Example 3 exhibited a brushy fracture surface typical of a composite, whereas Control C exhibited a smooth fracture surface typical of a monolithic article.

EXAMPLES 4 to 8

These examples illustrate the effect of the boron nitride content on the composite properties of a composite article according to the present invention.

Examples 4, 5, 6, 7, and 8 were each prepared and tested as described for Example 3 except the amount of boron nitride powder added to the phenolic resin/acetone blend was about 2, 4, 6.5, 8.5, and 10 percent, respectively, and two 5.1 cm (2 inch) sections of each sample were tested. The results are provided in Table 3, below.

TABLE 3

| Example | Amount of boron nitride particles added to phenolic resin/acetone blend, wt. % | SiC deposition time, hours | Weight % SiC of composite article | Fiber pullout | Burst strength, MPa (psi) |
|---|---|---|---|---|---|
| 4 | 2 | 7 | 64.5 | No | 55.4 (7920) |
| 5 | 4 | 11.5 | 64.9 | Yes | 68.2 (9740) |
| 6 | 6.5 | 24 | 64.5 | Yes | 55.5 (7935) |
| 7 | 8.5 | 24 | 65.6 | Yes | 49.0 (7000) |
| 8 | 10 | 24 | 65.8 | Yes | 52.1 (7445) |

An examination of the fracture surfaces of each of Examples 4, 5, 6, 7, and 8 revealed that all but Example 4 exhibited a brushy fracture surface.

EXAMPLE 9

A 198 cm (78 inch) section of a 8.3 cm (3.25 inch) diameter braided sleeving made of aluminoborosilicate fibers having a boria content of about 2 percent (commercially available under the trade designation "NEXTEL 440 CERAMIC FIBER" from 3M) was heat-cleaned as in Example 3. The fibers were in triaxial weave. The heat-cleaned sleeving was mounted onto a 8.3 cm (3.25 inch diameter) metal mandrel. The mandrel was supported over a catch tray in an exhaust hood so that it could be constantly and uniformly rotated about its long axis.

About 65 parts by volume of a phenolic resin (DURITE SC-1008) were added to about 582 parts by volume of reagent grade acetone. The ingredients were stirred for about 2 minutes. About 10.4 parts by weight of boron nitride powder (CERAC B-1084) were added to the phenolic resin/acetone blend.

The mounted sleeve was coated with the phenolic resin/acetone/boron nitride dispersion while rotating the mandrel. The amount of dispersion coated was sufficient to completely cover the mounted sleeving. Because the boron nitride powder had a tendency to settle, the dispersion was continuously agitated while it was poured onto the mounted sleeving.

The coated sleeving was rotated for about 40 minutes to allow the solvents present in the dispersion to evaporate, as well as to prevent the dispersion or components thereof from settling in one location.

The phenolic resin was cured by heating the mounted, coated sleeving for about 1 hour in an air atmosphere oven preheated to about 177° C. After curing, the mounted, coated sleeving was removed from the oven and allowed to cool to room temperature.

The addition of the cured phenolic resin/acetone/boron nitride dispersion increased the weight of the sleeving about 13.2 percent.

The length of the cured sleeve was trimmed to about 183 cm (72 inches), removed from the mandrel, and coated with silicon carbide as described in Example 3 except the quartz tube was about 243.8 cm (96 inches) in length with a diameter of about 33 cm (13 inches), the pressure within the furnace was about 20 torr, the flow rate of the precursor provide about 8 liters per minute each of methyltrichlorosilane gas and hydrogen gas, and the silicon carbide deposition time was about 28 hours. The amount of silicon carbide deposited increased the weight of the cured sleeve about 200 percent.

An examination of a fracture surface of the Example 9 tube revealed a brushy fracture surface typical of a composite.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A shaped composite article comprising ceramic oxide fiber, said ceramic oxide fiber having in said composite a surface which is available for coating, a first coating at least partially covering said surface of said ceramic oxide fiber available for coating to provide a surface which is available for overcoating, and a second coating at least partially covering that portion of said surface which is available for overcoating, wherein said first coating comprises a carbonaceous matrix which includes boron nitride particles in contact therewith, and said second coating comprises silicon carbide, with the proviso that said second coating covers at least a portion of said first coating.

2. The composite article according to claim 1 wherein said first coating covers at least about 1 percent of said surface available for coating and said second coating covers at least about 50 percent of said surface area available for overcoating.

3. The composite article according to claim 1 wherein said ceramic oxide fiber is present in the range from about 20 to about 50 percent by weight, said carbonaceous matrix is present in the range from about 0.2 to about 20 percent by weight, said boron nitride is present in the range from about 0.2 to about 15 percent by weight, and said silicon carbide is present in the range from about 50 to about 75 percent by weight, based on the total weight of said composite article.

4. The composite article according to claim 1 wherein said boron nitride particles have a particle size in the range from about 0.5 to about 30 micrometers.

5. The composite article according to claim 1 wherein a fracture surface of said composite article is brushy.

6. The composite article according to claim 1 wherein said ceramic oxide fiber is at least one of woven, braided, knitted, or wound.

7. The composite article according to claim 1 wherein said ceramic oxide fiber has a diameter in the range from about 1 to about 50 micrometers.

8. The composite article according to claim 1 which is a furnace element.

9. The composite article according to claim 1 which is a radiant heat burner tube.

10. The composite article according to claim 1 wherein said ceramic oxide fiber is alumina fiber.

11. The composite article according to claim 1 wherein said ceramic oxide fiber is aluminosilicate fiber.

12. The composite article according to claim 1 wherein said ceramic oxide fiber is aluminoborosilicate fiber.

* * * * *

UNITED STATES PATENT AND TRADEMARK OFFICE
CERTIFICATE OF CORRECTION

PATENT NO.: 5,523,133
DATED: June 4, 1996
INVENTOR(S): Smith

It is certified that error appears in the above-identified patent and that said Letters Patent is hereby corrected as shown below:   On the title page: Item [56]

In the References Cited section, please insert the following references:

--4,580,524  4/1986  Lackey, Jr. et al.  118/725
4,980,202  12/1990  Brennan et al.  427/249

"Silicon Carbide Composite Components", Reagan et al., Ceramic Eng. Science, 9[7-8], pp. 881-890 (1988)
"Advanced Ceramics by Chemical Vapor Deposition Techniques", Stinton et al., Ceramic Bulletin, Vol. 67, No. 2, 1988, pp. 350-355--

In column 2 line 6, please replace "in situ" with --in situ--

In column 2 line 14, please replace "in situ" with --in situ--

Signed and Sealed this

Nineteenth Day of August, 1997

*Attest:*

BRUCE LEHMAN

*Attesting Officer*   Commissioner of Patents and Trademarks